United States Patent [19]

Bottom, Jr.

[11] 4,413,189

[45] Nov. 1, 1983

[54] DEMAND REDUCTION SYSTEM FOR REGULATED ELECTRIC UTILITY DISTRIBUTION CIRCUITS

[76] Inventor: Dudley Bottom, Jr., 900 Craig Ave., Shelbyville, Ky. 40065

[21] Appl. No.: 319,205

[22] Filed: Nov. 9, 1981

[51] Int. Cl.³ .............................................. H02J 3/12
[52] U.S. Cl. ..................................... 307/31; 307/35; 323/256; 323/260
[58] Field of Search ............... 323/256, 259, 260, 341, 323/344; 307/17, 31-35, 62

[56] References Cited

U.S. PATENT DOCUMENTS 2,713,142  7/1955  Sealey ................................. 323/256
2,874,310  2/1959  Young ................................. 307/34

OTHER PUBLICATIONS

Honeywell W977 Load Management System, pp. 1-5, 12/77.

Primary Examiner—William H. Beha, Jr.
Attorney, Agent, or Firm—Maurice L. Miller, Jr.

[57] ABSTRACT

A circuit for automatically introducing a component of negative resistance line drop compensation into the control circuitry of a conventional voltage regulator to reduce the regulated voltage level on and, consequently, the load current level in a single phase primary electric distribution circuit during periods of peak load. The subject circuit automatically removes the negative resistance component from the regulator control circuitry during off-peak periods when the energy demand or loading on the distribution circuit is relatively low. A current transmitter is connected to a current transformer of the regulator to sense when the distribution circuit load current increases to a first predetermined level at or near peak load levels whereupon the transmitter actuates switching circuitry to introduce the negative resistance component into the regulator control circuitry after which the transmitter deactivates the switching circuitry to remove the component from the regulator control circuitry when the distribution system load current decreases to a second predetermined level below the first level. A switching circuit for demand reduction on a three phase electric distribution circuit is also disclosed.

5 Claims, 6 Drawing Figures

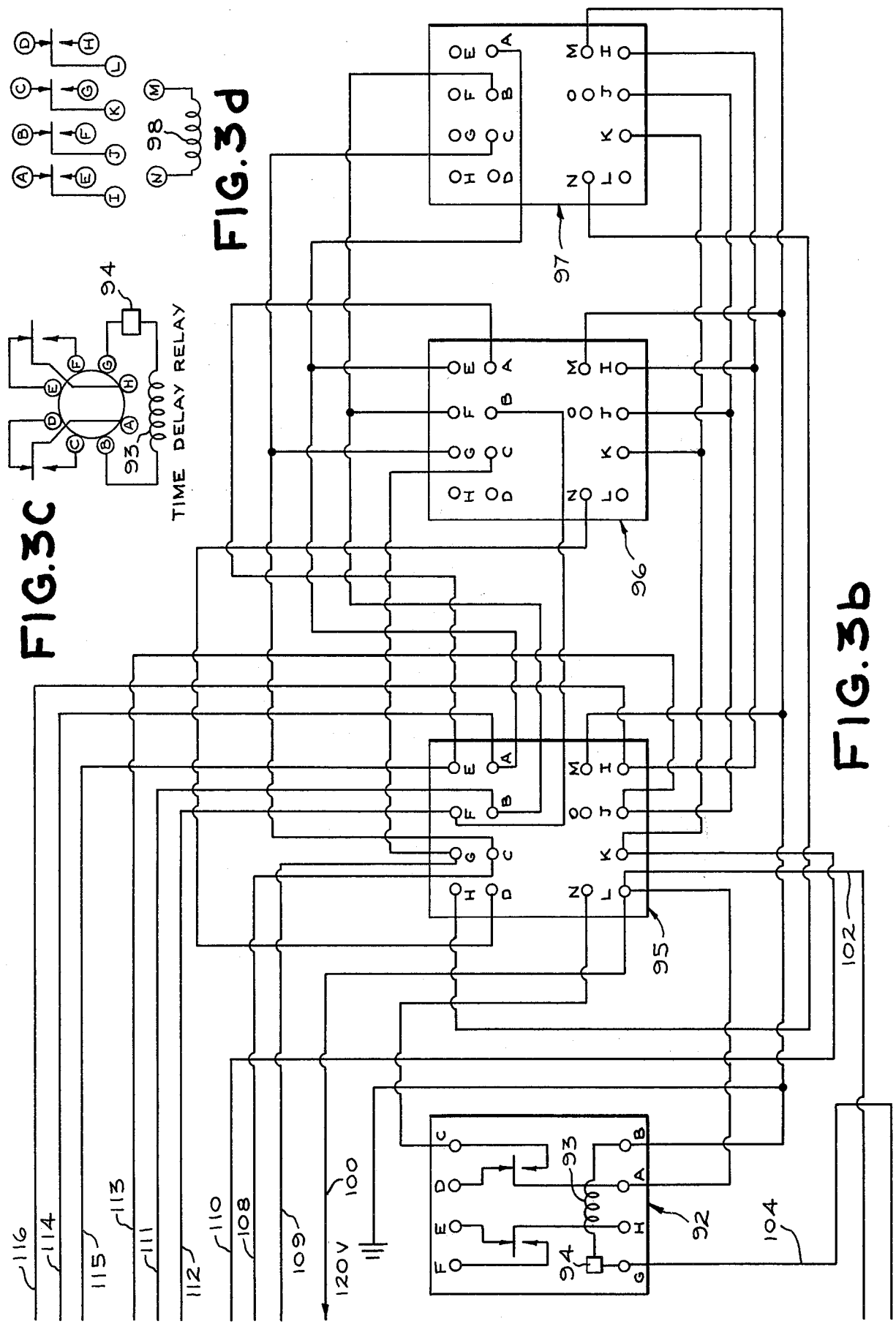

DEMAND REDUCTION SYSTEM FOR REGULATED ELECTRIC UTILITY DISTRIBUTION CIRCUITS

BACKGROUND OF THE INVENTION

This invention relates generally to the use of negative resistance line drop compensation in regulators employed to regulate output voltage levels of electric utility distribution substations. More specifically, this invention relates to control circuits for selectively and automatically introducing such compensation into substation regulator circuitry in order to reduce substation output voltage and, consequently, load current levels during periods of high customer energy demand or peak load conditions.

Distribution substation regulators having negative resistance line drop compensation circuitry have long been in use in the prior art. Basically, such prior art regulators allow an operator to manually adjust a resistance line drop compensator rheostat located on the regulator control panel such that the regulator control circuitry will perceive a higher substation output voltage than is actually present when a load current is flowing through the regulator, whereupon the regulator will lower the perceived output voltage to what the regulator perceives to be the proper range of output voltage levels. In reality, the regulator will then regulate the actual substation output voltage at and about a level which is below the regulated voltage level.

In the past such compensation has been used in the positive mode to keep substation output voltage level variations to an acceptable minimum at a specific geographic location in the distribution circuit. The compensation must be introduced manually into the regulator control circuitry in anticipation of such periods and removed or altered in anticipation of normal and peak substation loading. It is often difficult and time consuming for an operator to travel from his office to all of the regulated substations in a given utility system as frequently as may be required in order to make the desired compensator adjustments. While my invention utilizes such line drop compensation for an entirely different purpose, it provides for automatic introduction and removal thereof into and out of the regulator control circuitry and does not require repeated travel to and from the substation in anticipation of normally encountered load variations.

By means of my invention, this and other difficulties encountered using such compensation is substantially overcome. Moreover, my invention permits the use of negative resistance compensation in regulated substations to obtain a new and useful result not heretofore realized in the prior art.

SUMMARY OF THE INVENTION

It is an object of my invention to provide a demand reduction control circuit for reducing the energy demand or load upon regulated distribution substations and customer primary distribution circuits of electric utility systems during periods of peak energy demand or customer loading on such substations or distribution circuits.

Briefly, in accordance with the principles of my invention, and in association with a voltage regulator used for regulating the voltage on a single phase primary distribution circuit of an electric utility system of the conventional type which includes an auto-transformer, control circuitry for operating the auto-transformer, instrument transformers for sensing the voltage on and load current flowing in the distribution circuit, and negative resistance line drop compensating means operatively connectable to the control circuitry for reducing the regulated load voltage on the distribution circuit, I provide a circuit for reducing the energy demand or load on the distribution circuit. Specifically, I provide means connectable to the current transformer for sensing when the load current increases to a first predetermined value and thereafter decreases to a second predetermined value. Switching means is also provided which is responsively connected to the load current sensing means for connecting the compensating means to the control circuitry when the load current increases to the first predetermined value and for effectively removing the compensating means from the control circuitry thereafter when the load current decreases to the second predetermined value.

These and other objects, features and advantages of my invention will become apparent to those skilled in the art from the following detailed description and attached drawings upon which, by way of example, only the preferred embodiments of my invention are illustrated.

BRIEF DESCRIPTION OF THE DRAWINGS

FIGS. 3a–d show a schematic diagram of a demand reduction control circuit for simultaneously controlling the voltage on and, consequently, the current flowing in each phase of a regulated three-phase customer distribution circuit of a conventional distribution substation according to predetermined load current reference levels occurring in one selected single phase portion of the distribution circuit, thus illustrating another preferred embodiment of my invention.

DESCRIPTION OF THE PREFERRED EMBODIMENTS

Figure 1:
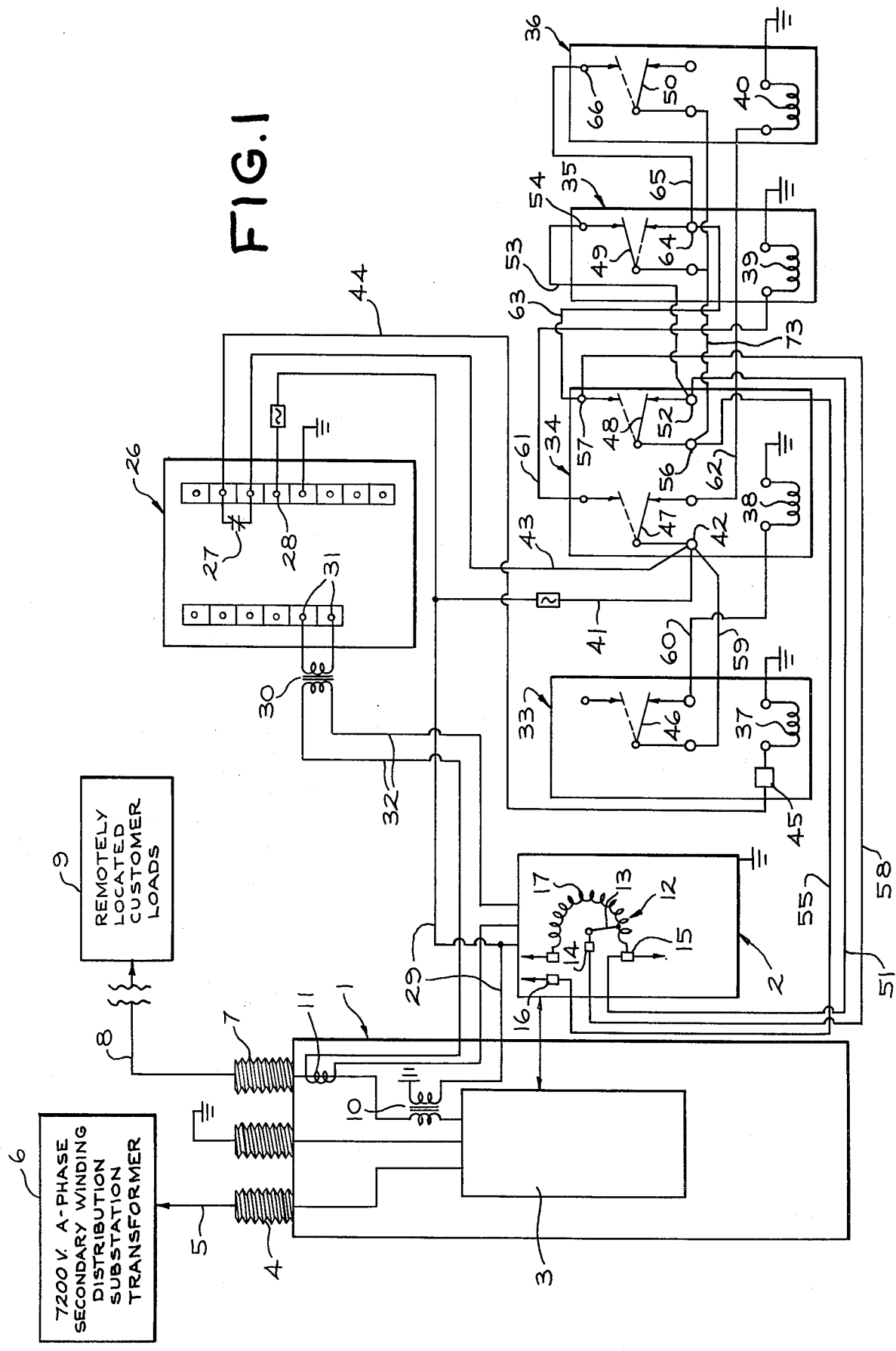
FIG. 1 shows a schematic diagram of a customer demand reduction control system for controlling the voltage on and, consequently, the current flow in, a single phase output circuit of a conventional regulated three-phase electric distribution substation, thus illustrating one preferred embodiment of my invention.
Figure 2:
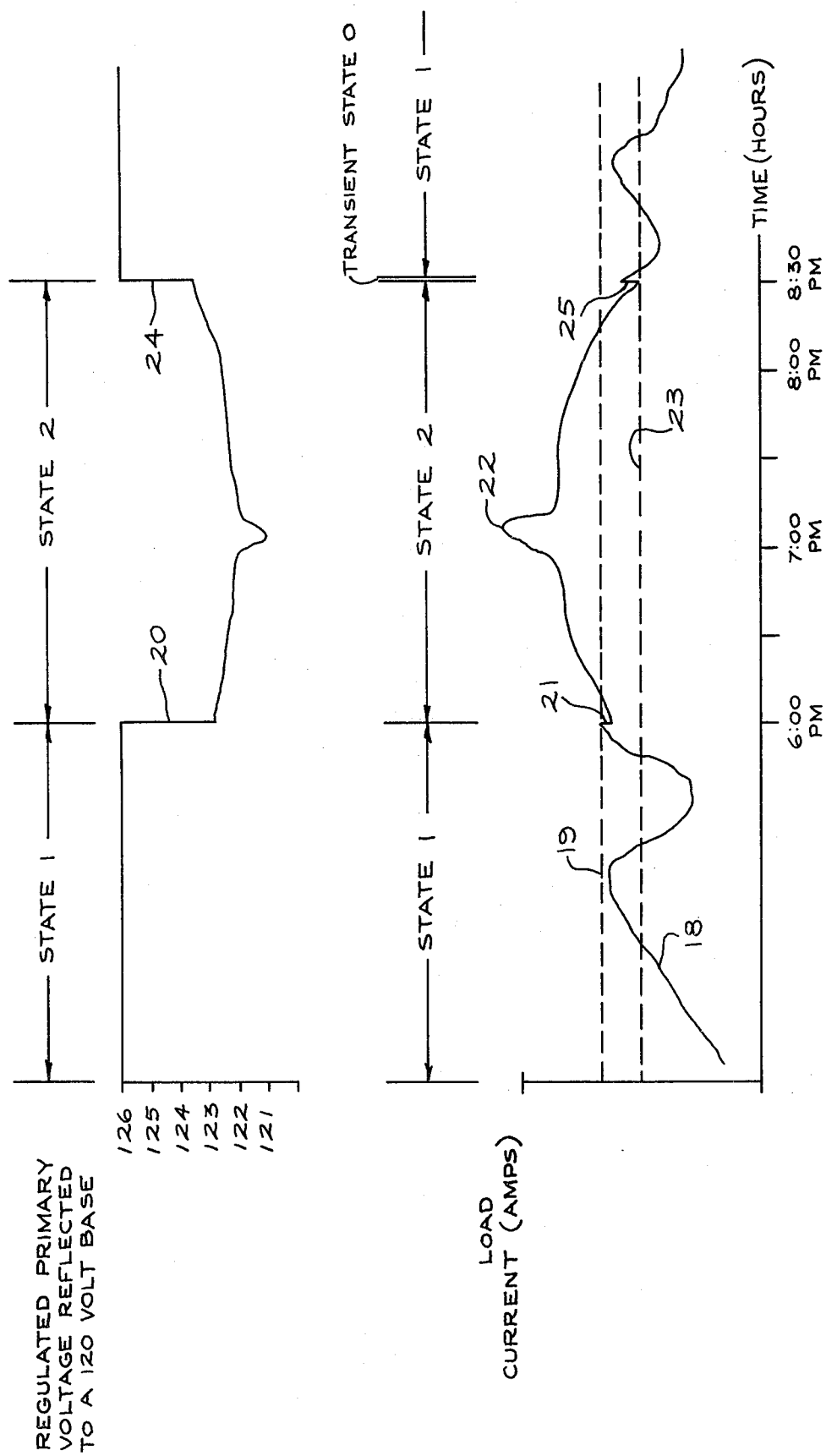
FIG. 2 is a graphical representation of a typical single phase output circuit voltage and current variation in a conventional regulated three-phase electric distribution substation over a period of several hours before, during and after a peak period of customer demand under the influence of the system of FIG. 1, with the voltage variations reflected in terms of conventional customer service voltage levels.
Figure 3A:
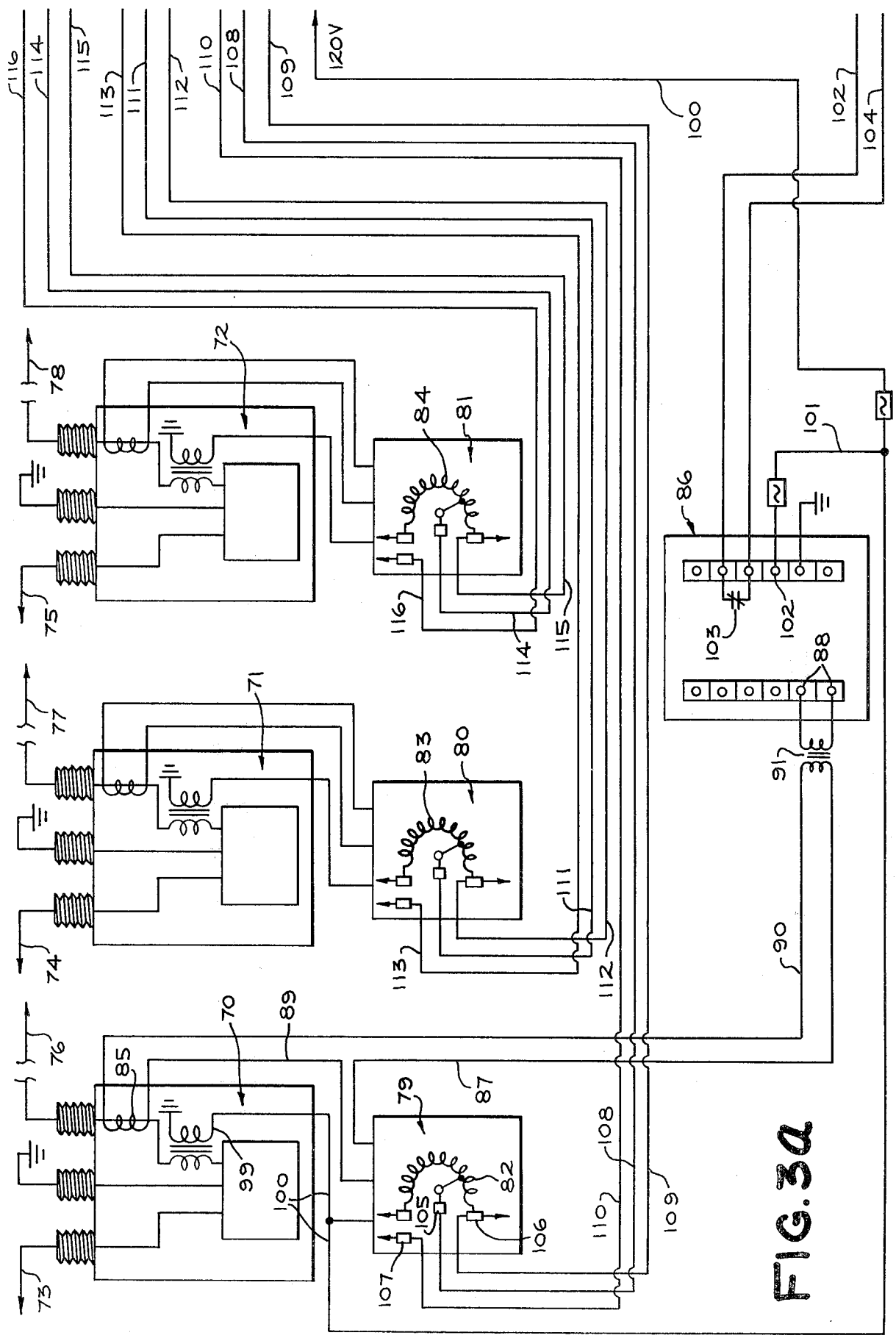

Referring now to FIGS. 1–2 and in particular FIG. 1, there is shown, in one preferred embodiment of my invention, a conventional 7200 volt single phase voltage regulator 1 and regulator control panel 2. The regulator 1 contains the usual auto-transformer and motor driven tap changing mechanism, generally represented by a block 3, an input terminal 4 electrically connected through a line 5 to one phase winding (A-phase, for example) of the secondary of a conventional distribution substation transformer 6, and an output terminal 7 connected through a single phase customer primary distribution circuit 8 to various customer loads located in the geographical service area served by the substation, as generally represented by a block 9. The regulator 1 also includes a voltage step-down instrument transformer 10 and a current step-down instrument transformer 11 for providing input information to the circuitry of the control panel 2 as to the voltage level on and load current flow in the primary distribution circuit 8.

The conventional control panel 2 includes the usual, well known control circuitry for utilizing the input information provided by the regulator instrument transformers 10 and 11 and for operating the tap changing mechanism 3 when appropriate to regulate the line voltage level on the primary circuit 8. Conventionally, the control panel 2 includes within its control circuitry, a resistance line drop compensator rheostat 12 which permits a substation operator to selectively introduce an incremental voltage drop into the control circuit which, under conditions of load current flow, adds to the voltage level sensed by the transformer 10 (negative resistance line drop compensation), or subtracts from that voltage level (positive resistance line drop compensation) as desired. The increment of voltage drop thus added or subtracted depends upon the manual setting of a slide arm 13 and the resulting value of resistance between the slide arm terminal 14 and one of the end terminals 15 or 16 (depending upon the particular brand of regulator) of the rheostat resistance winding 17. By reversing the manner in which the terminals 15 and 16 are connected to the remainder of the control circuitry of the panel 2, an operator can utilize either the negative or positive feature of the line drop compensator rheostat 12, all in a manner well known in the electric utility art. In accordance with my invention, the terminals 15, 16 must be properly connected to the remainder of the control circuitry so as to provide negative resistance line drop compensation when needed.

Now, in accordance with my invention, and referring also to FIG. 2, a customer demand reduction control system is provided which maintains the negative resistance line drop compensator 12 in a blocked condition, isolated from the control circuit of the panel 2, until the customer energy demand of the load 9 increases to a first preselected level in the range of peak substation loading. Such an energy demand level is determined by sensing the load current level (See curve 18, FIG. 2) flowing in the primary line 8 using the current transformer 11. When the load current 18 rises to a first preselected load current level (See dashed line 19, FIG. 2), the system of my invention unblocks the negative resistance compensation set on the rheostat 12, whereby the incremental voltage drop produced between the rheostat terminals 14 and 15 or 16 is added to the voltage level on the line 8 as sensed by the transformer 10 and control circuitry of the panel 2. The regulator 1 is thereby actuated to reduce the voltage level on the primary line 8 as at 20 in FIG. 2. Reduction of the line voltage level as at time 20 also reduces the current flow through line 8 to the load 9 (as at 21 in FIG. 2) proportionately, thus producing a reduction in energy demand upon the substation that would otherwise exist for all load current levels 18 which would otherwise exceed the preselected load current reference level 19. The negative resistance component of line drop compensation rheostat 12 remains effective in the control circuit of the panel 2 as the load current level 18 continues to increase toward its peak value as indicated in FIG. 2 at 22, and thereafter, until the load current level 18 decreases to a second predetermined reference level 23 as at time 24 in FIG. 2, at which time the control system of my invention removes the resistive line drop compensation rheostat 12 from the control circuit of the panel 2. Accordingly, the regulator 1 reacts to increase the line voltage 8 causing a proportionate increase in load current 18 as at 25 in FIG. 2. Thereafter, the system of my invention keeps the resistive line drop compensation of the rheostat 12 effectively isolated from the control circuit of the panel 2 so long as the load current 18 remains below the reference level 19.

To accomplish the foregoing, I provide a conventional current transmitter 26, such as a Model 7455 SC as manufactured by Scientific Columbus, Inc., 1900 Arlingate Lane, Columbus, Ohio 43228 having an adjustable dead band (Scientific Columbus special option EA) and a hermetically sealed DPDT relay (Scientific Columbus special option HC), the normally closed contacts 27 of which are shown in FIG. 1. Power to operate the transmitter 26 is supplied to the appropriate terminal thereof, terminal 28 in FIG. 1, through a line 29 from the regulator voltage transformer 10. A current comparator circuit (not shown) is included within the transmitter 26 which is used to compare the actual line current 18 on line 8, as sensed by the current transformer 11, with the reference current levels 19 and 23 which are selected and manually entered in the transmitter 26. The line current 18 sensed by the transformer 11 is supplied through a step-up current transformer 30 to the appropriate terminals of the transmitter 26, terminals 31 in FIG. 1, through a pair of lines 32.

Also provided as part of the control system of the present example is a DPST time delay relay 33, a DPDT relay 34, and a pair of SPDT relays 35, 36. The relays 33–36 are operated by alternately energizing and de-energizing relay coils 37–40, respectively. A 120 volt a.c. system control potential for operation of the relays 33–36 is supplied from the transformer 10, through the lines 29 and a line 41 to a terminal 42 of the relay 34 and thence through a line 43 and the contacts 27, when closed as shown, and a line 44 to a time delay circuit 45 of the relay 33. The time delay circuit 45 begins a predetermined countdown as soon as the control potential is applied thereto and remains open circuited with respect to the control potential on the line 44 until the countdown is complete, at which time it switches to place the control potential present onto relay coil 37 to energize the relay 33. When the control potential is removed from line 44 by the opening of contacts 27, the relay 33 is, of course, immediately de-energized. The delay time selected may be of any desired length of time but should at least be long enough to prohibit transient voltages on the line 44 from activating the relay 33. I have found that a 10 second delay or countdown time is sufficient for this purpose in most instances.

The period of time between application of the control potential to the circuit 45 and the instant preceding completion of the countdown and application of the control potential to the relay coil 37 is a brief transient state, State 0, during which the relay coils 37, 38 and 40 are de-energized and during which the relay coil 39 is energized. With the system briefly in State 0, a switch arm 46 of the relay 33 is in a raised position as viewed in FIG. 1, opposite the switch position shown; a pair of switch arms 47, 48 of the relay 34 are likewise in a raised position, opposite their positions as shown; a switch arm 49 of the relay 35 is in a lowered position as viewed, opposite its position as shown; and a switch arm 50 of the relay 36 is in a raised position, opposite its position as shown. Accordingly, during State 0, terminal 15 of the rheostat 12 is isolated from connection to the rheostat terminals 14 and 16 through the control system circuitry, and rheostat terminals 14, 16 are electrically connected together by such circuitry. This will be seen by observing that the terminal 15 is connected to a line 51, a terminal 52 of the relay 34, a line 53, and a terminal 54 of the relay 35. Since the switch arm 48 is in a raised position, out of contact with the terminal 52, and the switch arm 49 is in a lowered position out of contact with the terminal 54 when the system is in State 0, rheostat terminal 15 is thus isolated from contact through the system with terminals 14 and 16. On the other hand, in State 0, rheostat terminal 16 is connected through a line 55, a terminal 56 of the relay 34, the switch arm 48 (which is then in a raised position opposite its position as viewed), a terminal 57, and a line 58 back to the rheostat terminal 14. Also terminals 56 and 57 are connected through line 63 from terminal 57 to terminal 64, switch arm 49, line 73 to terminal 56 and from terminal 57 through line 63 to terminal 64 through line 65 to terminal 66, switch arm 50, line 73 to terminal 56. The purpose of this redundancy is to assure that the secondaries of the current transformers 11 and 30 do not become momentarily open circuited during operations of the relays 34, 35 and 36.

The demand reduction control system of the present example switches towards its first stable state, State 1, after the time delay circuit 45 completes its countdown and after the coil 37 is energized to place the switch arm 46 in a lowered position as shown. This action in turn causes the control potential present on the terminal 42 to be applied through a line 59, the switch arm 46, and a line 60 to the coil 38 of relay 34, whereby the switch arms 47 and 48 are placed in their lowered positions as shown. When this occurs, the control potential is first removed from a line 61 which previously supplied such potential to the coil 39 of relay 35 during State 0 and thereafter applies the control potential through a line 62 to energize the coil 40 of the relay 36. The switch arm 50 of relay 36 thereupon switches to its energized, lowered position as viewed. When all of these successive switching actions have taken place, the system enters State 1 wherein the relays 33, 34 and 36 are energized and the relay 35 is de-energized. Accordingly, the switch arms 46–50 and the transmitter contacts 27 occupy the positions as shown in FIG. 1. Also, in this State, rheostat terminals 15 and 16 are electrically connected together through the control system circuit and rheostat terminal 14 becomes isolated by the system circuit from terminals 15, 16. This is so because terminal 15 is now connected through line 51, terminal 52, switch arm 48, terminal 56 and line 55 back to rheostat terminal 16. Also terminals 52 and 56 are connected by line 53 to terminal 54, switch arm 49, and line 73. Again, this redundancy assures that the secondaries of the current transformers 11 and 30 do not become momentarily open circuited during operations of the relays 39, 35 and 36. At the same time, rheostat terminal 14 is connected through the line 58, to terminal 57 which is now disconnected from switch arm 48, and from terminal 57 through a line 63 to a terminal 64 which is disconnected from switch arm 49, and finally, from terminal 64 through a line 65 to terminal 66 which is now disconnected from switch arm 50. Accordingly, because the terminals 15 and 16 of the rheostat 12 are electrically connected together by the control system circuitry during State 1, the resistance line drop compensation feature of rheostat 12 is blocked out of the control circuit of the panel 2.

The demand reduction control system remains in State 1 until the load current 18 (FIG. 2) on the primary line 8 rises to the predetermined load current level 19 as at 21, at which time the system switches to the demand reduction control mode, State 2. This occurs when the comparator circuit of the transmitter 26 senses that the load current 18 on the line 8, as sensed by the transformer 11 and supplied through lines 32 and transformer 30 to the transmitter terminals 31 is equal to the preselected reference load current value 19, whereupon the transmitter relay contacts 27 open to remove the control potential from the line 44 and the time delay circuit 45. When this occurs, the coil 37 of the relay 33 becomes immediately de-energized and switch arm 46 becomes disconnected from the line 60, thus de-energizing the coil 38 of relay 34 and causing switch arms 47, 48 to move to their de-energized positions (raised positions opposite those shown in FIG. 1). When switch arm 47 raises and disconnects from the line 62, control potential is removed from the line 62 and the coil 40 of relay 36, and thereafter when switch arm 47 raises into contact with the line 61, control potential is re-applied to coil 39 of the relay 35. At the conclusion of these switching actions, the system enters State 2 wherein transmitter contacts 27 are open, relay 33, 34 and 36 are de-energized and relay 35 is energized. Accordingly, rheostat terminals 14 and 16 are directly connected together through the control system circuitry and terminal 15 of the rheostat 12 is isolated. Because rheostat terminals 14 and 16 are so connected, the negative resistance line drop compensation feature of the rheostat 12 is introduced into the control circuit of the panel 2, whereby the regulator 1 is activated to reduce the voltage level on the line 8 (as at 20 in FIG. 2) with a consequent proportional reduction in load current 18 being supplied to the load 9 (as at 21 in FIG. 2).

Once the system switches to the demand reduction state, State 2 as previously explained, the system will remain in that state so long as the load current 18 remains in or near the peak load range above the second load current reference level 23 as set on the transmitter 26. It is important at this point to realize that the load current reference level 19 at which it is desired to initiate the demand reduction mode should be sufficiently greater than the load current reference level 23 at which the system drops out of the demand reduction mode such that repetitive oscillation does not occur in the system between States 1, 2 and 0 and back again with a voltage reduction of 4%. I have found that where the system is employed in substations serving primarily residential loads, a difference between the load current reference levels 19 and 23 of from 5.0 to 8.0 percent will usually be sufficient spacing to avoid undesirably large numbers of regulator operations indicative of the aforementioned unstable condition. Where the system is employed with substations which serve sizable commercial or industrial loads along with residential loads with a voltage reduction of 4%, it may be found necessary to maintain a greater separation between the load current reference levels 19 and 23, perhaps as much as 8.0 to 12.0 percent, for example. In any case, the number of regulator operations which occur weekly as indicated by a meter usually found on the regulator will aid the operator in determining whether such an unstable system oscillation is, in fact, occurring and, if so, adjustments of the spacing between the load current reference levels 19 and 23 can readily be made at the transmitter 26 to eliminate the problem.

As previously stated, the system switches out of the demand reduction control mode, State 2, and back to transient State 0 as soon as the load current 18 falls back to the load current reference level 23 as set on the transmitter 26 at which time the contacts 27 again close to supply control potential back to the time delay circuit 45 to thus complete the cycle. As previously explained, the delay circuit 45 will commence its brief countdown once again, after the conclusion of which the system will then return to State 1 at which time the compensation rheostat 12 will again become blocked from introducing its preset resistive line drop compensation component into the control circuit of the panel 2, the regulator 1 will operate to increase the load voltage on the line 8 with a resulting increase in the load current 18 as at 25 in FIG. 2. Here again, it is to be understood that the load current reference levels 19 and 23 as set on the transmitter 26 must be sufficiently spaced apart so that the sudden increase in load current 18 does not exceed the reference level 19 and thus throw the system immediately back into the demand reduction mode after having just previously exited that state.

The demand reduction control system of FIG. 1 thus controls the level of customer energy demand or load during and near peak load conditions on a single phase portion of a regulated three-phase customer distribution primary circuit supplied by the usual distribution substation. Those skilled in the art will appreciate that where one such phase portion of a three-phase primary circuit is so controlled, it would be preferable to control the other two regulated phase portions of the primary circuit likewise, so as to maintain an efficient load balance on each phase winding of the substation transformer. Clearly, three separate and complete demand reduction control systems, identical to the one shown in FIG. 1, could be employed to control each phase portion of a regulated three phase substation output circuit. However, in using such a combination, normal unbalanced customer demand on the three separate phase portions of the output circuit could and, at times, undoubtedly would cause the three single phase regulators of the output circuit to operate at different times and thus possibly contribute further imbalances in the loading on the three phase substation transformer.

Accordingly, I prefer to utilize demand reduction control systems on each phase portion of a regulated three phase output circuit in such a manner that all three systems are actuated simultaneously by the load current levels occurring in one selected single phase portion of the output circuit. By so doing, the three separate control systems will not contribute substantially to load imbalances that may inherently exist in the three phase output circuit. Moreover, only one current transmitter, similar to the transmitter 26, and one time delay relay similar to the relay 33, need be employed for simultaneous operation of all three systems. In addition, the relay used by all three systems to perform the same function as the relay 34 need only have one double throw switch 47 wired in the same manner as shown in FIG. 1, although such relay will require three sets of double throw switches to perform the same function as the switch arm 48, each wired in the same manner as shown in FIG. 1 to a different regulator line drop compensation rheostat to be controlled. Likewise, the relays of the three phase control system which perform the same functions as relays 35 and 36 perform on a single regulator, will each require three sets of double throw contacts, one set of such contacts of each relay being wired as shown in FIG. 1 for operation of a different regulator of the three phase output circuit.

Referring now to FIGS. 3a-d, such a demand reduction control system for simultaneously operating three conventional single phase voltage regulators 70, 71 and 72 connected in different single phase portions of a three phase customer distribution substation output circuit in accordance with the load current levels which occur in one selected single phase portion of the output circuit is shown. The regulators 70, 71 and 72 are respectively connected to single phase lines 73, 74 and 75, which extend from different single phase windings of the secondary circuit of a conventional three phase distribution substation transformer, not shown, and customer distribution output lines 76, 77 and 78, respectively, which latter lines form single phase portions of the three phase substation output circuit. For purposes of illustration, assume that the lines 73, 76 constitute the A-phase portion of the output circuit while the lines 74, 77 and 75, 78 constitute the B-phase and C-phase portions of the output circuit, respectively. Thus the regulators 70, 71 and 72 regulate the voltage levels on the A, B and C phase portions of the output circuit respectively. Each of the regulators 70, 71 and 72 are similar to the single phase regulator 1 shown in FIG. 1 and described in the previous example of my subject invention and each such regulator has its own control panel 79, 80 and 81, respectively. Within each of the control panels 79, 80 and 81 is contained the usual, well known regulator control circuitry, not shown, and resistance line drop compensator rheostats 82, 83 and 84 connectable into the control panel circuitry in the negative resistance mode, also in the usual, well known manner.

While operation of the system of the present example can be made a function of load current levels occurring in any desired single phase portion of the three phase output circuit 76, 77 and 78, for purposes of illustration only, the system of FIG. 3 is connected for operation as a function of load current levels occurring in the A-phase portion of the output circuit as monitored by a current instrument transformer 85 located in the A-phase regulator 70. A single current transmitter 86, which may be identical to the transmitter 26 of the previous example as shown in FIG. 1, is employed in the circuit of the present example. Current levels flowing in the line 76 as sensed by the transformer 85 are supplied through a line 89 to the control panel 79 in the usual manner and thence from the panel 79 through a line 87 to a current transformer 91 and to input terminals 88 of the transmitter 86. A return path for the current from the current transformer 91 is provided through a line 90 back to the instrument transformer 85 to thus form a closed circuit. The current transformer 91 may be employed between the lines 87 and 90 and the current input and output terminals 88 if necessary to place the sensed current supplied to the transmitter 86 within the required range as set by the manufacturer of the unit.

The control circuitry of the present example as shown in FIG. 3b includes a conventional time delay relay 92 containing a 120 volt relay coil 93 connected in series with a time delay switching circuit 94. While the relay 92 shown is of the popular DPDT type, only one switching section is used whereby a SPDT type time delay relay such as shown in FIG. 1 by the relay 33 may be substituted in place of the relay 92 as shown. The control circuit also includes three four pole, double thrown relays 95, 96 and 97 each of which is operated by its own 120 volt relay coil 98 connected between terminals NM as shown in FIGS. 3b and 3d. The normal switch positions of the relays 95, 96 and 97 as they exist when the coils 98 are de-energized are shown in FIG. 3d. Similarly, the normal switch positions of the time delay relay 92 as they exist when the coil 93 is de-energized is shown in FIG. 3c. An approximate 120 volt operating potential for the relays 92, 95, 96 and 97 is supplied from a voltage instrument transformer 99, through a line 100 to a terminal L located on the relay 95. Control potential for operation of the transmitter 86 is supplied from the line 100 through a line 101 to a 120 volt input terminal 102 of the unit. Also, this control potential is supplied from terminal L of the relay 95, via line 102 to one side of a normally closed switch 103 located across two terminals of the transmitter 86 and thence back through a line 104 to the timing circuit 94 of time delay relay 92. The time delay relay 92 and the switch terminals D, H, L of the relay 95 are thus wired in the same manner to serve the same function as the time delay relay 33 and the terminals of the switch 47 of the relay 34 of FIG. 1. Control of the A-phase regulator 70 is obtained by wiring the switch sections associated with the terminals C, G and K of the relays 95, 96 and 97 to the terminals 105, 106 and 107 of the rheostat 82 in the same identical manner as the terminals of switch sections 48, 49 and 50 of the relays 34, 35 and 36 are wired to the terminals 14, 15 and 16 of the rheostat 12 of FIG. 1. Similarly, control of the B-phase regulator 71 is obtained by wiring the switch sections associated with the terminals B, F and J of the relays 95, 96 and 97 to the corresponding terminals of the rheostat 83 in the same manner as the switch sections 48, 49 and 50 of the relays 34, 35 and 36 are wired to the terminals 14, 15 and 16 of the rheostat 12 of FIG. 1. Also, control of the C-phase regulator 72 is obtained by wiring the switch sections associated with the terminals A, E and I of the relays 95, 96 and 97 to the corresponding terminals of the rheostat 84 in the same manner as the switch sections 48, 49 and 50 of the relays 34, 35 and 36 are wired to the terminals 14, 15 and 16 of the rheostat 12 of FIG. 1. Accordingly, the terminals 105, 106 and 107 of rheostat 82 are connected by means of lines 108, 109 and 110, respectively, to terminals C, G and K of the relay 95, while the corresponding terminals of the rheostats 83 and 84 are connected by means of lines 111, 112 and 113 to the terminals B, F and J and the lines 114, 115 and 116 to the terminals A, E and I of the relay 95, respectively.

Operation of the system of the present example is thus identical to that of the simplified system of FIG. 1 except that when the load current levels in the A-phase regulator 70 dictate introduction or removal of negative resistance line drop compensation into or out of the control circuitry of the control panel 79, the same thing happens at the same time in the control circuitry of the control panels 80 and 81. Thus, regulated primary voltage and load current level on each phase of the regulated three phase output circuits 76, 77, 78 will have the characteristics as generally exemplified by the graphs of FIG. 2.

Although the subject invention has been described and explained with respect to specific details of certain preferred embodiments thereof, it is not intended that such details limit the scope of the present invention otherwise than as set forth in the following claims.

I claim:

1. In association with a voltage regulator used for regulating the voltage on a single phase primary customer distribution circuit of an electric utility system of the conventional type which includes an auto-transformer, control circuitry for operating said auto-transformer, instrument transformers for sensing the voltage on and load current flowing in said distribution circuit, and negative resistance line drop compensating means operatively connectable to said control circuitry for reducing the regulated load voltage on said distribution circuit, a circuit for reducing the energy demand or load on said distribution circuit during periods of peak energy demand or load comprising means connected to said current transformer for sensing when said load current increases to a first predetermined value and for thereafter sensing when said load current decreases to a second predetermined value, said second value being less than said first value, a time delay relay responsively connected to said load current sensing means and adapted to actuate at a preselected time after said load current increases to said first value and to thereafter de-activate when said load current decreases to said second value, and means responsively connected to said time delay relay for introducing said compensating means into said control circuitry upon activation of said time delay relay and for effectively removing said compensating means from said control circuitry upon de-activation of said time delay relay while maintaining continuity in a secondary circuit of said load current sensing instrument transformer.

2. The demand reducing circuit of claim 1 wherein said load current sensing means comprises a current transmitter.

3. The demand reducing circuit of claim 1 wherein said introducing and removing means comprises second, third and fourth relays responsively connected to said time delay relay and operatively connected to said compensating means and control circuitry.

4. The demand reducing circuit of claim 3 wherein said load current sensing means contains a relay switch which is normally closed when said load current is less than said first predetermined value, a control potential generated by said voltage instrument transformer being supplied to one side of said relay switch, the other side of said relay switch being connected to the time delay circuit of said time delay relay, said relay switch being adapted to open to remove said control potential from said time delay circuit when said load current increases to said first predetermined value and to remain open until said load current decreases to said second predetermined level.

5. In association with the voltage regulators used for regulating the voltage levels on a multi-phase primary customer distribution circuit of an electric utility system of the conventional type wherein each of said regulators include an auto-transformer, control circuitry for operating said auto-transformer, instrument transformers for sensing the voltage on and load current flowing in said distribution circuit, and negative resistance line drop compensating means operatively connectable to said control circuitry for reducing the regulated load voltage on said distribution circuit, a circuit for reducing the energy demand or load on said multi-phase distribution circuit during periods of peak energy demand or load comprising means connectable to one of said current transformers for sensing when the load current in one selected phase of said multi-phase distribution circuit increases to a first predetermined value and thereafter decreases to a second predetermined value, said second value being less than said first value, a time delay relay responsively connected to said load current sensing means and adapted to activate at a preselected time after the load current in said selected phase increases to said first value and to de-activate thereafter when said load current in said selected phase decreases to said second value, first switching means responsively connected to said time delay relay for introducing said compensating means into the corresponding control circuitry of the regulator of said selected phase upon activation of said time delay relay and for effectively removing said compensating means of the regulator of said selected phase from the corresponding control circuitry of the regulator of said selected phase while maintaining continuity in a secondary circuit of a load current sensing instrument transformer associated with the regulator of said selected phase, and second switching means responsively connected to said first switching means for connecting the compensating means of each of the remaining regulators of said multi-phase circuit to its corresponding regulator control circuitry and for effectively removing the compensating means of each of said remaining regulators from its corresponding control circuitry in accordance with the corresponding operations of said first switching means while maintaining continuity in secondary circuits of the load current sensing instrument transformers of said remaining regulators.

* * * * *